Patented May 5, 1942

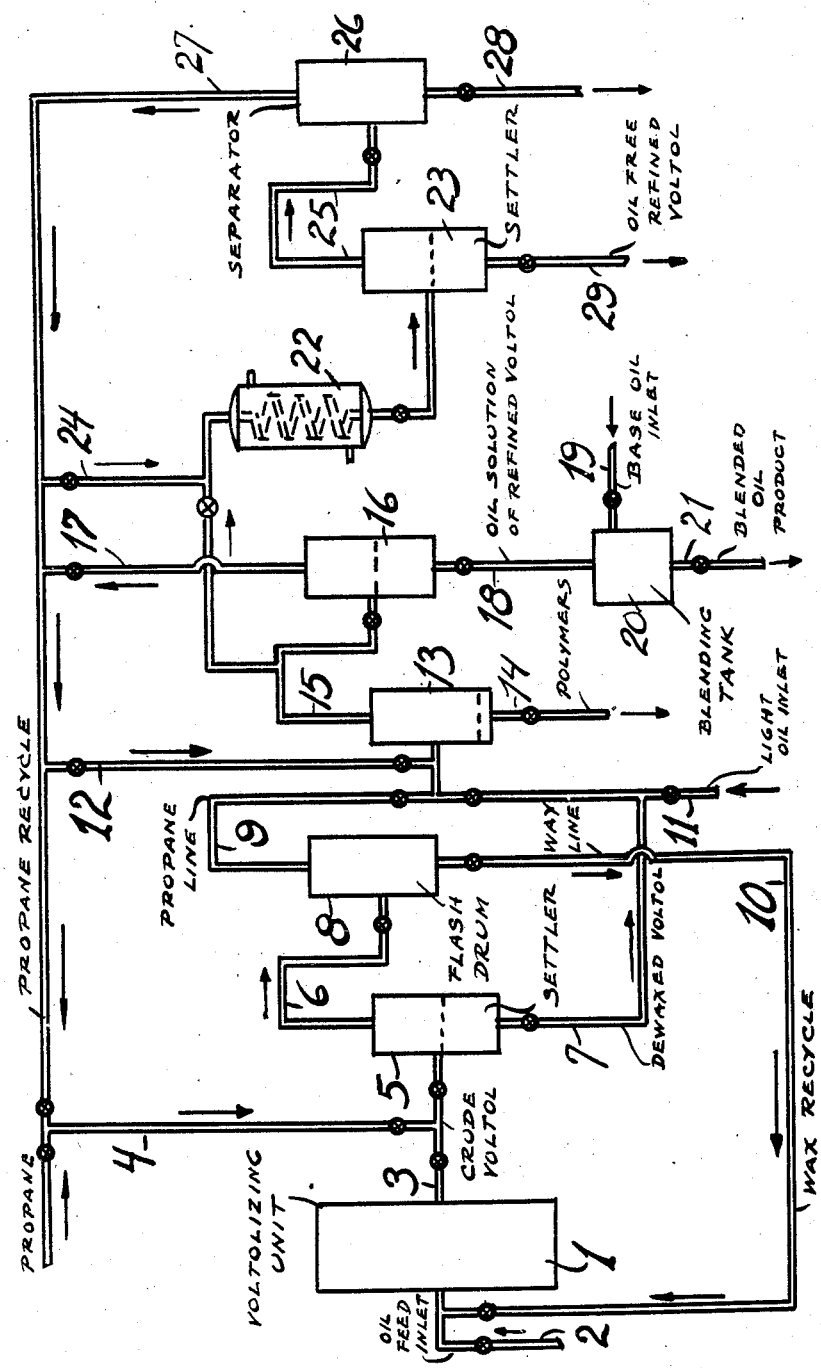

2,281,979

UNITED STATES PATENT OFFICE 2,281,979

HYDROCARBON TREATMENT

Charles N. Kimberlin, Baton Rouge, La., assignor to Standard Oil Development Company, a corporation of Delaware Application October 21, 1939, Serial No. 300,512

8 Claims. (Cl. 196—13)

The present invention relates to an improved high quality composition comprising an oil and a high molecular weight oil polymer. The invention more particularly relates to a process for the production of high quality, high molecular weight oil polymers which are particularly adapted as blending agents with oils. The invention is especially concerned with the refining of petroleum oil blending polymers, produced by subjecting suitable petroleum oils to the effect of the silent electric glow discharge. In accordance with the present process high molecular weight blending polymer compositions are refined by treating said compositions with a solvent comprising a liquefied normally gaseous hydrocarbon and a light petroleum oil. The present process produces an exceptional high molecular weight polymer composition which when blended with suitable base oils produces high quality products not heretofore secured.

It is known in the art to produce high molecular weight oil polymers by various processes. For example, it is known to polymerize vegetable, animal and mineral oils by treating the same with various catalysts such as aluminum chloride or by heating the oils under polymerizing conditions. Another known method of producing high molecular weight oil polymers is to subject feed oils to the effect of the silent electric glow discharge under suitable temperature and pressure conditions. These high molecular weight oil polymers produced by this so-called voltolization operation are known as voltols. The voltolization process comprises subjecting suitable feed oils to the effect of a high electrical discharge under pressures which vary from .001 mm. to .2 atmosphere. However, in general, the pressures commercially employed are in the range from .01 to .2 atmosphere. The voltages used are preferably in the range from 1,000 to 10,000 volts, although voltages as high as 20,000 or 50,000 may be utilized provided suitable dielectric materials are available. The frequency of the alternating current is generally in the range from about 60 to 10,000 cycles, although under certain conditions considerably higher frequencies may be used. In the voltolization operation it is preferred to provide external cooling means in order to keep the temperature sufficiently low in order that the quality of the products is not impaired. This is necessary since the heat of the reaction is frequently sufficient to raise the temperature of the mixture to 300° C. and higher. Under certain conditions it may be desirable to voltolize the oils at temperatures in the range below about 100° C. or below about 40° C. The voltolization operation is conducted for a time sufficient to produce a product having the desired viscosity. The resulting viscosities of the final products will widely vary and will depend upon the character of the feed oil as well as upon the operating conditions of the voltolization process.

The molecular weights and viscosities of the polymerized oils vary over a very wide range and it is necessary that the polymerized products be further refined before they can be utilized as blending agents and the like. Further refining of the polymers is especially necessary when the polymers are produced by subjecting petroleum oils to the effect of the silent electric discharge particularly when these materials are used as blending agents with other petroleum oil fractions. For example, a very desirable product comprises a voltolized petroleum petrolatum and a petroleum base oil. This product is prepared by polymerizing a petroleum petrolatum oil by subjecting the same to the effect of the silent electric discharge. The voltolized product is then treated with a liquefied normally gaseous hydrocarbon in order to segregate the polymerized constituents from the non-polymerized constituents. The polymerized constituents are then blended with suitable base oils in order to produce the desired products such as Diesel oils and the like.

Although these blends comprising voltolized petroleum oils and petroleum base oils are entirely satisfactory from certain standpoints, they are undesirable in that the blends are hazy. In order to overcome this, various refining procedures have been tried which have not been entirely successful. I have now discovered a process by which it is possible to refine the voltolized products in a manner so that upon subsequent blending with base oils the resulting product will be clear and entirely suitable from a commercial viewpoint. In accordance with my invention, the voltolized product after separation of the non-voltolized constituents is treated with a mixture comprising a liquefied normally gaseous hydrocarbon and a base oil. This will separate the haze forming materials in a complete and efficient manner.

The process of my invention may be readily understood by reference to the attached drawing illustrating one modification of the same. A feed oil which for the purposes of illustration is taken to be a highly paraffinic petroleum oil having a gravity of about 28° A. P. I. and a viscosity of about 75 Saybolt at 210° F. is introduced into voltolizing unit 1 by means of feed line 2. This material is subjected to the effect of a silent electric discharge having a frequency in the range of about 10,000 cycles, a voltage in the range of about 2500 volts and under a pressure of about 0.05 atmosphere. External cooling means are employed in order to keep the temperature below about 180° F. The voltolized product having a gravity in the range from about 25° to 30° A. P. I. and having a viscosity Saybolt at 210° F. in the range from about 4,000 to 5,000 is withdrawn from voltolizing unit 1 by means of line 3 and mixed with a refining agent which is introduced by means of line 4. For the purposes of illustration, it is assumed that the refining agent is a liquefied normally gaseous hydrocarbon such as liquid propane. The mixture comprising the voltolized oil and added liquid propane is passed into settler 5 in which a propane phase containing dissolved therein the non-voltolized oil and voltolized oil phase form. The propane phase containing dissolved therein the non-voltolized oil is withdrawn from settler 5 by means of line 6, while the polymerized oil phase is withdrawn by means of line 7. The propane solution containing the non-polymerized oil is introduced into flash drum unit 8 in which the separation is made between the propane and the non-polymerized oil. The propane is withdrawn from flash drum 8 by means of line 9, while the non-polymerized oil is withdrawn by means of line 10 and recycled to the voltolization unit, if desired, by combining with the fresh feed in line 2. The polymerized oil free of non-polymerized constituents withdrawn by means of line 7 is then mixed with a light petroleum oil having a gravity in the range from about 25° to about 35° A. P. I. and a viscosity in the range from about 40 to about 65 Saybolt at 210° F. which is introduced into the system by means of line 11. This mixture comprising polymerized oil and the added light oil is then combined with propane which is introduced by means of line 9 or by means of line 12 and the entire mixture introduced into settler 13. Temperature and pressure conditions are maintained in settler 13 to secure the formation of a small heavy polymer phase and the formation of a propane-oil phase containing dissolved therein the polymerized oil. The heavier phase comprising the high overvoltolized haze-forming polymers is withdrawn from settler 13 by means of line 14, while the propane-oil solution of voltol is withdrawn from settler 13 by means of line 15. This solution is introduced into separator 16 in which the propane is separated from the oil and voltol, removed overhead by means of line 17 and recycled to the system by means of lines 4 and 12. The solution of oil and voltol is withdrawn from separator 16 by means of line 18 and handled in any manner desirable. Generally the light oil added by means of line 11 is finished oil for use in the final product. Thus the oil-voltol mixture free of propane removed by means of line 18 is suitable as a concentrate for incorporation with additional oil which may be introduced by means of line 19. The final product comprising 99.5% to 80% or 60% of a non-voltolized high quality base oil and from 0.5% to 20% or 40% of a refined voltolized oil is removed by means of line 21.

Under certain conditions it is preferred to recover refined voltolized oil free of added light oil used in conjunction with the propane in the refining process. This is accomplished by heating the propane oil solution of voltol removed from settler 13 in heating unit 22 and then introducing the mixture into settler 23. A voltol phase and a propane phase containing the added oil form. This phase separation may also be secured or facilitated by adding additional propane by means of line 24. The propane solution is withdrawn by means of line 25 and passed into separator 26 in which the propane is separated from the refining oil and removed by means of line 27. The refining oil is removed by means of line 28 and may be recycled to the system by means of line 11. It is to be understood that if desired the propane refining oil solution removed by means of line 25 may be handled to remove any excess propane and an optimum mixture of propane and refining oil mixed with the voltol removed from settler 5 by means of line 7. The refined polymerized oil free of propane and added refining oil is removed from settler 23 by means of line 29 and blended with refined base oils in any desirable concentration.

The process of the present invention may be widely varied. Although the invention may be applied in the removal of over-polymerized material from any polymerized product, the invention is particularly applicable in the removal of over-voltolized materials resulting in voltolization processes. In these processes in which vegetable, fatty, animal and mineral oils, as well as fatty acids, alcohols and the like are polymerized for the production of specialty products, the crude voltolized product comprises non-polymerized constituents, the desired product and over-voltolized constituents. Thus, the present invention is especially useful in the refining of crude voltolized oils.

A particular adaptation of the present process is in the manufacture of oils suitable for use as Diesel oils and the like. These oils must necessarily be of a relatively high quality and have inspection in the following general range:

Gravity °A. P. I. _____ 20 to 35
Viscosity Saybolt _____ 40 to 75 seconds at 210° F.
Viscosity index _____ 20 to 100

These oils are produced by subjecting a highly paraffinic petroleum oil having a gravity in the range from about 25° to 35° A. P. I. and a viscosity from about 40 to about 75 Saybolt at 210° F. to the effect of the silent electric discharge under voltolizing conditions. The crude voltolized product having a viscosity in the range from 1000 to 8000 Saybolt at 210° F. is then treated in a manner to remove the non-polymerized material. This is accomplished by treating the crude product with a lower boiling hydrocarbon, preferably a hydrocarbon boiling in the range below the boiling point of butane. Particularly desirable results are secured if the lower boiling hydrocarbon comprises a liquefied normally gaseous hydrocarbon. The amount of hydrocarbon used will depend upon the particular feed oil which was voltolized and the extent and conditions of the voltolization operation. For example, when using liquid propane, it is preferred to treat the voltolized crude product with from 4 to 8 volumes of propane per volume of voltolized material.

The temperature and pressure conditions employed in the treatment of the crude voltolized material will depend upon the particular lower boiling hydrocarbon used as well as upon the character of the voltolized product. For example, when using liquefied propane the pressure is sufficient to keep the propane in the liquid condition and the temperature is preferably in the range from 180° F. to 200° F.

The propane treated voltolized product under these conditions will form a propane phase containing the non-polymerized material and a high molecular weight voltolized polymer phase. The respective phases are separated and the voltolized polymer then further refined. This is accomplished by blending with said polymerized product a relatively light petroleum oil having a gravity in the range of about 25° to 35° A. P. I., and a Saybolt viscosity in the range from about 40 to 65 at 210° F.

The amount of light oil added will vary, depending upon the particular light oil added and also upon the character of the voltolized product. When using a light oil of the character described, it is preferred to add from 0.5 to 1.5 volumes of light oil per volume of voltolized product. Propane is then added. The quantity of propane added will likewise depend upon the particular light oil being used and the character of the voltolized oil. In general, it is preferred to add from 4 to 10 volumes of propane, based upon the total quantity of light oil added.

The desired voltolized product dissolves in the propane light oil phase while the relatively small amount of over-voltolized oil insoluble material is precipitated. The propane light oil phase containing dissolved therein the polymerized product is separated and handled in a manner to segregate the polymerized product. This is accomplished by heating the mixture or by adding additional propane to the mixture in order to form a propane light oil phase and a polymerized product phase which are then separated. The polymerized product when added to base oils in the desired concentrations produces homogeneous clear blends. If the light oil added is suitable as a base oil, it is necessary to remove only the propane from the propane light oil phase resulting in the production of a polymerized product concentrate to which additional light oil may be added in order to secure the desired blend. In general, these blends comprise 1.0% to 10.0% of the refined polymerized product in base oils having gravities in the range from 20° to 35° A. P. I., and viscosities in the range from 40 to 115 Saybolt at 210° F.

In order to more fully illustrate the invention, the following examples are given which should not be construed as limiting the same in any manner whatsoever. All viscosities are Saybolt at 210° F.

*Example 1*

A highly paraffinic petroleum oil known in the petroleum industry as petrolatum having a gravity in the range from 28° to 30° A. P. I. and a viscosity in the range from 72 to 75, was subjected to the effect of the silent electric glow discharge at 10,000 cycles and 2500 volts under a pressure of 0.05 atmosphere. A voltolized product having a gravity in the range from 28° to 30° A. P. I. and a viscosity in the range from 4000 to 5000 was secured.

The voltolized material was treated three times with 500% liquefied propane at a temperature about 200° F. The relatively low molecular weight non-polymerized waxy materials were removed with the propane. From 100 parts of the voltolized petrolatum having a viscosity of about 4500, there was obtained about 66 parts of voltol having a gravity of about 28° and a viscosity of above 20,000. This voltol was added to a base oil having a viscosity of about 52, a color of about 10½ Robinson, and a cloud below 20° F. in order to produce a blend comprising about 3% of voltol. This blend had a muddy color and a distinct haze.

In another operation conducted under the above described conditions the 66 parts of voltol were further refined in accordance with the present process. About 66 parts of a petroleum oil having a gravity of 29.6, a flash of 450° F., a viscosity of 52, a cloud of 28° F., a pour of 20° F., a color 10½ Robinson, and a viscosity index of 97½ were added to the voltol. Propane was then added to this mixture at 90° F. until the solution was at the point of incipient precipitation. A total of 8⅓ volumes of liquid propane were used per volume of dewaxed voltol. The mixture was filtered to remove about one part of by-volume of haze-forming over-voltolized material and the propane then removed, leaving about 130 parts of voltol concentrate. This concentrate when added to the above described base oil formed a homogeneous blend which was clear and entirely free of haze-forming constituents.

*Example 2*

Petrolatum of a viscosity of about 50 to 75 was charged to a voltolization plant of a trommel design and treated until the viscosity of the treated oil was about 4500. About ⅙ to 1/12 of the treated oil was withdrawn and an equivalent amount of fresh and recycled oil added. The blend was again processed until the viscosity of the treated oil was about 4000 to 5000. This procedure was repeated a number of times.

Apparently the polymerization proceeds slowly at first until a large number of nuclei polymers are formed. Since the rate of polymerization then proceeds rapidly, the nuclei polymers are believed to combine with each other much faster than with unconverted materials. Therefore, when the final viscosity of 4500 is reached, about 40% to 50% of the charge is, if at all, only slightly polymerized.

The polymerized material was dewaxed with propane at 180° F. under the vapor pressure of the propane, in a three stage continuous countercurrent propane unit. The propane solution of non-polymerized material was removed. One portion of the polymer was blended with a base oil to produce a 3% blend of polymer. The blend was quite hazy and undesirable for commercial use. Another portion of the polymer was mixed with an equal volume of refined light oil suitable for use as a Diesel oil and the mixture treated with 600% by volume of propane. The blend was cooled to 75° to 80° F. and filtered to remove the precipitate. The propane was then separated from the oil polymer concentrate. This material when added to base oils described above produced a clear stable blend, entirely free of hazy constituents.

The process of the present invention is not to be limited by any theory or mode of operation.

I claim:

1. Process for the removal of over-polymerized constituents from polymerized oils comprising treating said polymerized oils with a mixture comprising a low boiling petroleum hydrocarbon and a light oil boiling in the lubricating oil range under conditions to precipitate said over-polymerized constituents and to retain said polymerized oil in solution, separating the precipitated constituents and recovering the polymerized oils from said solution.

2. Process in accordance with claim 1 in which said polymerized oils have Saybolt viscosities at 210° F. in excess of 4,000, in which said low boiling hydrocarbon is liquefied propane and in which said light oil has a Saybolt viscosity at 210° F. in the range from about 40 to 65.

3. Process for the removal of over-polymerized oil insoluble constituents from polymerized oils which have been produced by subjecting feed oils to the effect of the silent electric glow discharge comprising treating said polymerized oils with a mixture comprising a liquefied normally gaseous hydrocarbon and a light petroleum oil boiling in the lubricating oil range, whereby said over-polymerized oil insoluble constituents are precipitated and said polymerized oils are retained in solution, separating the precipitated constituents and recovering the polymerized oil from said solution.

4. Process in accordance with claim 3 in which said polymerized oils have Saybolt viscosities at 210° F. in excess of 4,000, in which said liquefied normally gaseous hydrocarbon is propane and in which said light oil has a Saybolt viscosity at 210° F. in the range from about 40 to 65.

5. Process for the production of high quality polymerized oils, secured by subjecting feed oils to the effect of the silent electric glow discharge, free of non-polymerized and over-polymerized impurities comprising contacting said polymerized oils with a low boiling hydrocarbon whereby a low boiling hydrocarbon solution phase, containing the non-polymerized material, and a polymerized oil phase are formed, separating the respective phases and treating said polymerized oil phase with a solvent comprising a liquefied normally gaseous hydrocarbon oil and a light petroleum oil boiling in the lubricating oil range, whereby over-polymerized impurities are precipitated and the high quality polymerized oil retained in solution, separating the precipitated constituents and recovering the polymerized oil from said solution.

6. Process in accordance with claim 5 in which said low boiling hydrocarbon is liquefied propane, in which said liquefied normally gaseous hydrocarbon is propane, and in which said light oil has a Saybolt viscosity at 210° F. in the range from about 40 to 65.

7. Process for the production of a non-hazy oil blend comprising a petroleum oil polymer and a non-polymerized petroleum oil base comprising subjecting a petroleum oil to the effect of the silent electric glow discharge under polymerizing conditions, treating the polymerized oil with a low boiling hydrocarbon solvent to dissolve the non-polymerized constituents, separating the polymerized oil and contacting the same with a mixture of liquid propane and a light oil boiling in the lubricating oil range, whereby oil insoluble constituents are precipitated and polymerized oil retained in solution, separating the precipitate and recovering the polymerized oil product from said solution, then blending said product with said base oil.

8. Process for the production of clear Diesel oils comprising at least 80% of a base oil having a Saybolt viscosity at 210° F. in the range from about 40 to 75, a viscosity index in the range from about 20 to 100 and an A. P. I. gravity in the range from about 20 to 35, and from 1% to 20% of a polymerized oil having a viscosity in excess of 20,000 comprising subjecting a petroleum feed oil to the effect of the silent electric glow discharge under polymerizing conditions, treating the polymerized oil with liquid propane to dissolve the non-polymerized constituents, separating the polymerized oil and contacting the same with a mixture of liquid propane and a light oil, said light oil having a Saybolt viscosity at 210° F. in the range from about 40 to 65 and an A. P. I. gravity in the range from about 25 to 35, whereby oil insoluble constituents are precipitated, separating said precipitate, recovering the polymerized oil product and blending said product with said base oil.

CHARLES N. KIMBERLIN.